United States Patent [19]
Shu

[11] Patent Number: 5,526,493
[45] Date of Patent: Jun. 11, 1996

[54] DOCKING DETECTION AND SUSPEND CIRCUIT FOR PORTABLE COMPUTER/EXPANSION CHASSIS DOCKING SYSTEM

[75] Inventor: Thomas Shu, Austin, Tex.

[73] Assignee: Dell USA, Austin, Tex.

[21] Appl. No.: 72,207

[22] Filed: Jun. 3, 1993

[51] Int. Cl.⁶ .................................................. G06F 13/00
[52] U.S. Cl. .................. 395/281; 395/283; 364/708.1
[58] Field of Search ................................. 395/325, 500, 395/700, 750; 364/514, 707, 708

[56] References Cited

U.S. PATENT DOCUMENTS

| | | | |
|---|---|---|---|
| 4,564,751 | 1/1986 | Alley et al. | 235/146 |
| 4,788,658 | 11/1988 | Hanebuth | 364/900 |
| 4,903,222 | 2/1990 | Carter et al. | 364/708 |
| 4,978,949 | 12/1990 | Herron et al. | 340/711 |
| 4,999,787 | 3/1991 | McNalley et al. | 364/514 |
| 5,107,400 | 4/1992 | Kobayashi | 361/392 |
| 5,117,378 | 5/1992 | Ho | 364/708 |
| 5,126,954 | 6/1992 | Morita | 364/708 |
| 5,157,771 | 10/1992 | Losi et al. | 395/325 |
| 5,159,533 | 10/1992 | Kuang | 361/391 |
| 5,210,855 | 5/1993 | Bartol | 395/500 |
| 5,265,238 | 11/1993 | Canova, Jr. et al. | 395/700 |
| 5,313,596 | 5/1994 | Swindler et al. | 395/325 |
| 5,317,697 | 5/1994 | Husak et al. | 395/325 |
| 5,394,552 | 2/1995 | Shirota | 395/750 |

*Primary Examiner*—Jack B. Harvey
*Assistant Examiner*—David A. Wiley
*Attorney, Agent, or Firm*—Henry N. Garrana; Mark P. Kahler; Michelle M. Turner

[57] ABSTRACT

A docking detection and suspend circuit for portable computer/expansion chassis docking system. A first circuit within the portable computer is capable of detecting an impending electrical coupling of the portable computer to a corresponding docking station and generating a signal indicating the impending coupling. A second circuit within the portable computer and coupled to the first circuit is capable of receiving the signal and placing the portable computer in a suspend mode at least until the portable computer fully electrically couples to the docking station. The present invention relieves a computer user of the task of manually placing the portable computer in the suspend mode prior to docking with the docking station. The present invention protects components within both the portable computer and the docking station from being damaged by docking the portable computer when in a normal operational mode and prevents the user's data from being corrupted.

30 Claims, 3 Drawing Sheets

DOCKING DETECTION AND SUSPEND CIRCUIT FOR PORTABLE COMPUTER/EXPANSION CHASSIS DOCKING SYSTEM

CROSS REFERENCE TO RELATED APPLICATION

This application is related to U.S. Pat. No. 5,313,596, entitled "MOTORIZED PORTABLE COMPUTER/EXPANSION CHASSIS DOCKING SYSTEM", commonly assigned herewith and incorporated herein by reference.

TECHNICAL FIELD OF THE INVENTION

The present invention is directed, in general, to a computer apparatus and, more particularly, to a circuit and method for use in conjunction with a portable computer and an associated docking station to allow the portable computer to be docked with the docking station while still in a normal operating mode.

BACKGROUND OF THE INVENTION

Portable, battery-powered computers have become increasingly popular over the last several years due to their light weight and small size that permit them to be easily hand-carried in an ordinary briefcase and used by business travelers in cramped spaces, such as on airline seat back trays, lacking electrical plug-in facilities. In fact, a particularly small type of portable computer, the notebook computer, is very popular, generally having dimensions of 8.5"× 11" and a weight of less than 8 pounds. For purposes of this discussion, "portable" and "notebook" are synonymous terms. The modern portable computer typically incorporates both hard and floppy disk drives, a monitor screen built into its lid portion, and a keyboard built into its main body portion. It is thus a fully self-contained computer able to be conventionally used, for at least short periods of time, in situations and locations in which the use of a much larger desktop computer is simply not feasible.

As is well-known, however, even state-of-the-art portable computers have certain limitations and disadvantages, compared to their much larger desktop computer counterparts. For example, the compact keyboard of a portable computer is often considerably less comfortable to use for extended periods of time compared to the more spacious separate keyboards normally provided with desktop computers.

Additionally, to reduce the space requirements for the typical portable computer keyboard, many of its keys, that would have but a single function on a desktop computer keyboard, are provided with multiple functions which can be confusing to user switching back and forth between desktop and portable computers. Moreover, compared to its desktop computer counterpart, the portable computer monitor typically does not provide its viewer with as sharp a display image. After an extended computing session, this reduction in display clarity can cause the computer user to experience at least some degree of eye strain. Another disadvantage of portable computers is that, due to their small size, they typically do not provide access for expansion cards such as, for example, network, sound, graphics accelerator and multimedia cards which desktop computer units are conventionally configured to receive.

Because of these short comings inherent in portable computers, it is a common practice for their owners to also purchase a desktop computer system for home or office use.

A typical scenario for these two-computer owners, after returning home after using their portable computer on a business trip, is to transfer their files, data, spreadsheets and the like from their portable computer to their desktop computer and continue working on the initiated project or projects using the larger and more comfortable desktop peripheral equipment such as the external monitor, keyboard and mouse.

The task of effecting this state of transfer from a portable computer to the desktop computer (and vice versa in preparation for a subsequent road trip) is not a particularly convenient one for the computer user. It is typically accomplished by the often time consuming method of (1) inserting a floppy disk into the portable computer, (2) copying a portion of the data from the portable computer hard drive onto the inserted floppy disk, (3) removing the floppy disk from the portable computer (4) inserting the removed floppy disk into the desktop computer, (5) copying the data from the floppy disk onto the hard drive of the desktop computer and then (6) repeating steps (1) through (5), as necessary, until all of the desired data is transferred from the portable computer to the desktop computer.

Alternatively, various software is available for use in a portable computer to down load data therefrom to a desktop computer through a cable interconnected between the serial ports on the portable and desktop computers. This procedure, while somewhat more convenient than laboriously shuffling floppy disk back and forth between the two computers has other disadvantages. For example, it requires the additional purchase and installation of the transfer of software which occupies space in the portable computer hard drive-space which is often at a premium in the relatively small hard drives typically provided in portable computers.

Moreover, each time data has to be transferred from the portable computer to the desktop computer, a cable must be interconnected between the two computers and subsequently disconnected. This can be a rather awkward task since the serial port on a desktop computer is typically located on its backside in the midst of a jumble of other cables.

In addition to the inconvenience of these conventional methods of transferring data back and forth between portable and desktop computers there is, of course, the considerable expense entailed in purchasing two complete computer system to provide both the compactness and portability of a portable computer and the greater capacity and use comfort of a desktop computer. Some of this expense may be avoided by purchasing (in addition to the portable computer) only desktop computer peripheral equipment—such as a monitor, keyboard, mouse and external hard drive—for home or office use.

When the user works at his home or office station, he connects the portable computer to the desktop computer peripheral equipment, using the necessary interconnect cables to fashion a highbred computer system utilizing the portable computer central processing unit ("CPU") in conjunction with the desktop computer peripheral devices. While this alternative approach is less expensive than purchasing two complete computer system, it is highly inconvenient due to the number of cables that must be interconnected between the portable computer and the desktop peripherals to "construct" the hybrid system and later be disconnected to free the portable computer for travel use. Additionally, the jumble of interconnect cables sprawling across the desk or table area creates a decidedly disorderly and unattractive work station.

In response to these problems and inconveniences, interconnect structures commonly referred to as "docking stations" have been previously proposed. A docking station is basically a housing structure, considerably larger than a portable computer and designed to be left in place on a home or office desktop, to which the portable computer may be removably connected by releasably interengaging mating plug and socket portions (also called "connectors") fixedly secured to the portable computer and the associated docking station.

The docking station is typically connected to external desktop peripheral devices, such as a monitor, keyboard and mouse, that remain in place on the desktop work station. Disposed within the docking station housing are various components that serve to operatively connect the portable computer to these desktop peripheral devices when the portable computer is plugged into the docking station. However, the docking station is not provided with a CPU. Instead, when the portable computer is "docked" in this manner, its CPU is utilized in the resulting desktop computer work station and the desktop keyboard, monitor and mouse are used in any subsequent desktop computing task. After these tasks are completed, the portable computer can simply be unplugged from the docking station and carried away for use of the removed portable computer in its usual self-contained mode.

Compared to the previous necessity of purchasing a complete desktop computer system in addition to a portable computer, the use of this docking station concept provides several distinct advantages. For example, since the docking station is not furnished with its own CPU (using, in place thereof, the portable computer's CPU) the overall cost of providing both portable and home or office-based computer work stations is substantially reduced.

Additionally, the previous inconvenience of transferring data from the portable computer to the desktop system is essentially eliminated since the requisite notebook/desktop computer interface with its data transfer is achieved simply by plugging the portable computer into the docking station (which may have an internal hard drive or be connected to an external hard drive) without the need for switching floppy disk back and forth or using an external interconnection cable. Moreover, from a connection convenience standpoint, the use of the plug-in docking station is clearly preferable to laboriously connecting the portable computer directly to desktop peripheral devices using several separate interconnect cables.

Despite their cost reduction and convenience advantages, previously proposed docking stations have tended to have certain problems associated therewith relating to their physical connection to the associated portable computer. For example, since the relatively small plug-in interface between the docking station and the portable computer must effect a multitude of electrical connections between the internal operating components in the portable computer and the docking station housing, mating high density pin connector structures (one on the portable computer and one on the docking station) are typically used to provide the plug-in computer/docking station mechanical interconnect.

A typical method of creating this interconnection is to place the portable computer on the docking station, with the mating pin connectors in a facing, spaced apart relationship with one another, and then manually pushing the portable computer toward the docking station connector pin structure to create the plug-in connection. The need to precisely align the facing connectors, coupled with the high mating force requirement associated with these high density pin connectors, typically requires that this manual connection task be carefully and precisely performed to avoid potential damage to the connector pin structures. The same care must be exercised, and a considerable amount of manual force exerted, in disconnecting the portable computer from the docking station to avoid connector pin damage.

Another problem typically associated with conventional manually operable docking station systems is that it is possible to attempt to dock the portable computer while the computer is in a normal operating mode and the docking station is off, or vice versa. A "normal operating mode" is defined as a mode in which the portable computer's CPU is fully functional, executing instructions and accessing the various buses. The normal operating mode is as opposed to a "suspend mode" (or "sleep mode") wherein the CPU is stopped and the buses are inactive or an "off" mode wherein the portable computer is powered down. An attempt to dock the portable computer while it is still in a normal operating mode creates a voltage mismatch between the mating portable computer and docking station connectors. This voltage mismatch has two undesirable effects: (1) the user's data stored in the main memory of the portable computer is highly likely to be corrupted or destroyed and (2) input buffers and other components within both the portable computer and the docking station may be damaged if the voltage mismatch persists.

Ser. No. (DC-00275) is directed to a portable computer/docking system employing a carrier under motor control to overcome the insertion force problems noted above. The portable computer/docking station includes a photodarlington detector to detect whether a power indicator on the portable computer is lit, indicating that the portable computer is in its normal operating mode. If the portable computer is in its normal operating mode, as indicated by the power indicator being lit, the docking station reverses its motor to eject the portable computer, thereby refusing its docking until the user places the portable computer into a suspend mode or turns the computer off.

It is very desirable, however, to have the docking station accept the portable computer in its normal operating mode for docking instead of rejecting it out of hand. The portable computer should be able to detect when it is about to be docked and should be able to automatically react by placing itself in a suspend mode before actually docking.

SUMMARY OF THE INVENTION

Accordingly, the present invention addresses the above-noted need by providing a circuit and method for suspending operation of a docking portable computer. The circuit comprises (1) a first circuit within the portable computer capable of detecting an impending electrical coupling of the portable computer to a corresponding docking station, the first circuit generating a signal indicating the impending coupling and (2) a second circuit within the portable computer capable of receiving the signal and placing the portable computer in a suspend mode at least until the portable computer fully electrically couples to the docking station.

In a preferred embodiment of the present invention, the portable computer has a first electrical connector on a rear surface thereof, the first connector comprising a first plurality of electrical contacts and coupled to a portable computer controller within the portable computer. The docking station has a corresponding second electrical connector on an interior surface thereof, the second connector comprising a second plurality of electrical contacts and coupled to a docking station controller within the docking station. The portable computer is adapted to translate rearwardly under motive force to a location within the docking station. The first and second corresponding electrical connectors are adapted to translate towards one another from an initial spaced-apart position to mechanically join the first and second connectors to effect a docking of the portable computer to the docking station. The advantage of this arrangement is that the present invention is easily employed in the portable computer/docking system described above, allowing docking of a portable computer, regardless of mode, to be as easy as inserting a video cassette into a VCR.

In a preferred embodiment of the present invention, a first contact on the first connector couples to a corresponding second contact on the second connector prior to a remainder of contacts on the first connector coupling to a remainder of contacts on the second connector. The AMP Corporation sells off-the-shelf connectors that offer this feature. This allows the present invention to be incorporated as a low-cost hardware/software modification to the above-described portable computer/docking system.

Another object of the present invention is to also give the docking station advanced warning of an impending docking so as to allow the docking station to ready itself for the docking. Accordingly, the present invention provides a third circuit within the docking station capable of detecting the electrical coupling of the portable computer with the docking station, the third circuit transmitting a signal to a docking station controller within the docking station, the docking station controller placing electrical components within the docking station in a condition to receive the portable computer.

Still another object of the present invention is to allow the portable computer the option of restoring itself to a normal operating mode following full docking. Accordingly, in a preferred embodiment, the second circuit restores the portable computer to a normal operating mode following full electrical coupling of the portable computer with the docking station. This is an option only. The present invention still contemplates the possibility of the user manually restoring the portable computer to a normal operating mode.

Another object of the present invention is to allow for the possibility that the connectors are misaligned when docking is in progress. Accordingly, the present invention provides that the first circuit detects the impending electrical coupling when the portable computer and the docking station are misaligned. The manner in which this is done is in connection with the detailed description.

Again, it is an object of the present invention to operate in conjunction with the portable computer/docking system described in the background of the invention. That docking station is motorized. Accordingly, in the present invention, a motor within the docking station provides a motive force to translate the portable computer to couple the portable computer to the docking station. This allows a controller within the docking station to tightly control the position of the portable computer at all times. This has the particular advantage of ensuring that the portable computer has time to transition to a suspend mode before full docking takes place.

In accordance with the above-noted objects, a preferred embodiment of the present invention also includes a method of electrically joining a portable computer to a corresponding docking station comprising the steps of (1) monitoring a status of a first connector on a rear surface of the portable computer with a portable computer controller, the first connector comprising a first plurality of electrical contacts, (2) monitoring a status of a second electrical connector on an interior surface of the docking station with a docking station controller, the second connector comprising a second plurality of electrical contacts corresponding to the first plurality of contacts, (3) translating the portable computer rearwardly under motive force to a location within the docking station, the first and second connectors translating towards one another from an initial spaced-apart position to effect a mechanical joining of the first plurality of contacts with the corresponding second plurality of contacts to effect a docking of the portable computer to the docking station, (4) coupling some of the first plurality of contacts to a corresponding some of the second plurality of contacts prior to all of the plurality of contacts coupling to the corresponding second plurality of contacts, (5) detecting the coupling of the some of the first plurality of contacts to the corresponding some of the second contacts with a first circuit within the portable computer, (6) transmitting a first signal from the first circuit to the portable computer controller, (7) placing the portable computer in a suspend mode with the portable computer controller at least until the first and second connectors are completely mechanically joined, (8) detecting the coupling of the some of the first plurality of contacts to the corresponding some of the second contacts with a second circuit in the docking station, (9) transmitting a second signal from the second circuit to the docking station controller, (10) placing electrical components within the docking station in a condition to receive the portable computer with the docking station controller and (11) coupling a remainder of the first plurality of contacts to a corresponding remainder of the second plurality of contacts to effect a docking of the portable computer to the docking station.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
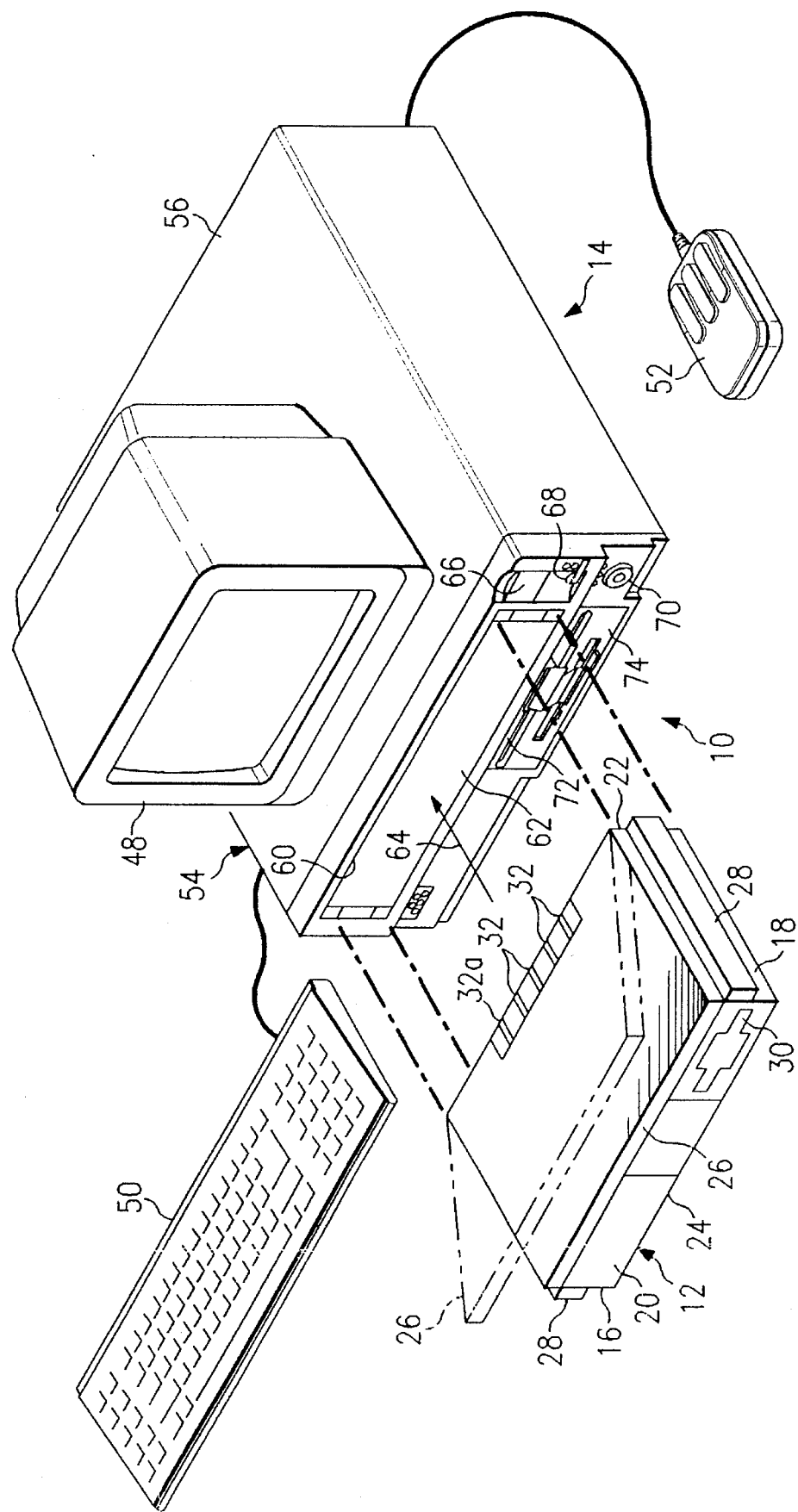
FIG. 1 illustrates a somewhat simplified front and right side partially exploded perspective view of a specially designed portable computer and an associated docking station embodying principles of the present invention.
Figure 2:
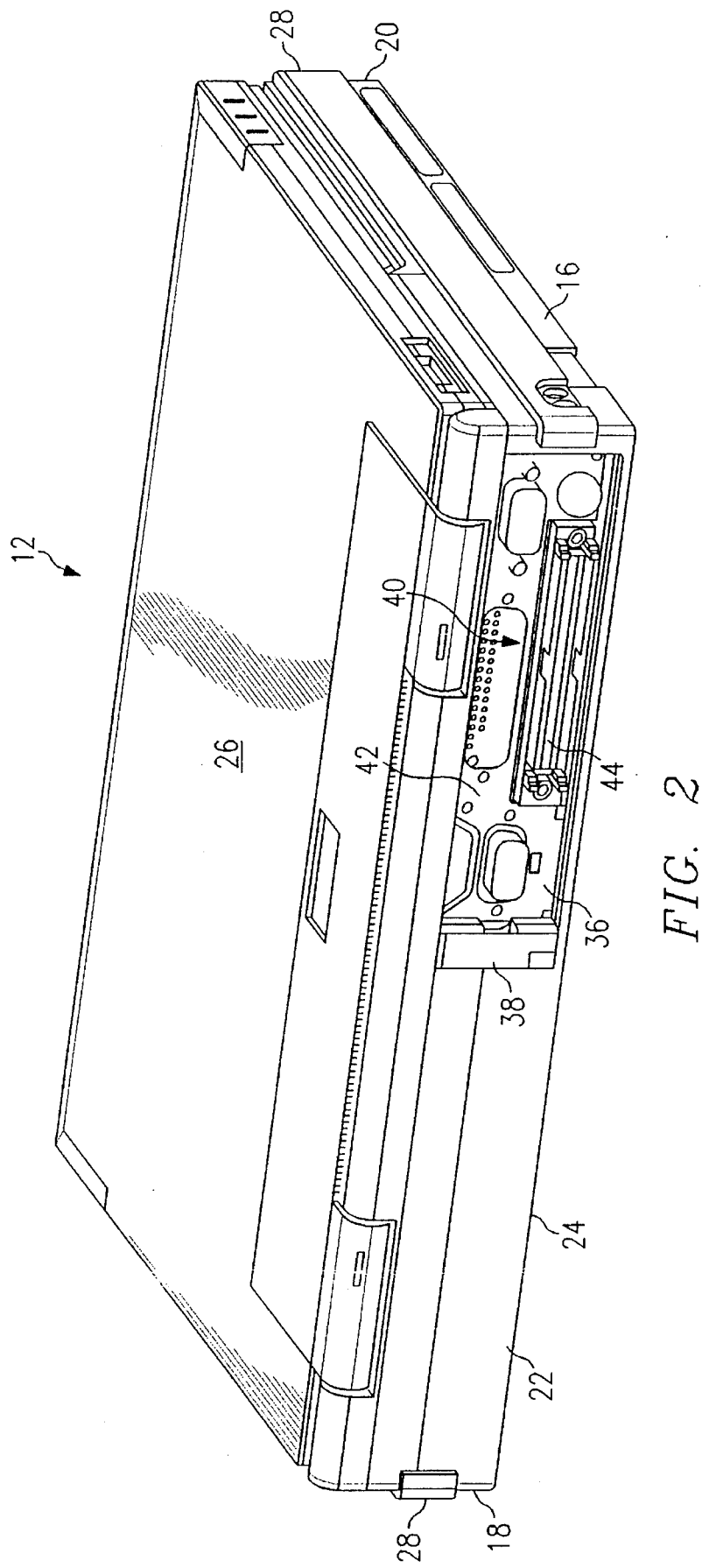
FIG. 2 illustrates an enlarged scale rear, left and top side perspective view of the portable computer.

Referring initially to FIGS. 1 and 2, the present invention provides a specially designed portable computer/docking station 10 including a portable computer 12 and a docking station structure or expansion chassis 14, hereinafter referred to simply as the "docking station." The portable computer 12 is of a relatively thin rectangular configuration and has a body portion with left and right side 16 and 18, front and rear sides 20 and 22 and a bottom side 24.

Pivotally secured to the top side of the computer body portion is a rectangular lid 26 which, as indicated in phantom in FIG. 1, may be pivoted upwardly in the usual manner to expose a keyboard (not shown) on the top side of the computer body, and a display screen (also not shown) on the underside of the lid 26. For purposes later described, a pair of generally rectangularly configured guide rails 28 longitudinally extend along the left and right side walls 16 and 18 and laterally project outwardly therefrom.

In a conventional manner, the portable computer 12 has a variety of internally mounted operating components (not illustrated in FIG. 1, but partially represented in FIG. 3) including a hard drive, a floppy disk drive having a disk insertion slot 30 on the front side 20 of the computer body and a mother board. At the back edge of the lid 26 are a series of light emitting diode (LED) indicating lights 32 including a "power on" indicating light 32a.

With respect to FIG. 2, a rectangular opening 36 is centrally formed in the back side 22 of the computer body. A rectangular door plate 38 is slidably affixed to the back computer body side 22 and may be horizontally moved between its illustrated open position in which it covers the opening 36, and a closed position (achieved by sliding the door plate 38 to the right as viewed in FIG. 2) in which it covers the opening. When the door plate 38 is opined, the opening exposes a recessed input/output ("I/O") port structure 40 having a metal plate portion 42 inwardly adjacent to opening 36.

Recessed into the rear computer body side 22, within the opening 36 and below the I/O port structure 40, is a high-density male electrical pin type connector section 44.

Referring again to FIG. 1, the docking station 14 is considerably larger than the portable computer 12, has a rectangular configuration and is adapted to rest on the table or desk portion of a home or office computer work station. As schematically depicted in FIG. 1, the docking station is representatively connected to conventional external desktop computer peripheral devices such as a monitor 48, a keyboard 50 and a mouse 52. The docking station 14 includes a housing 54 having a top cover portion 56 which is removable to expose operating components within the docking station.

Extending along the front side of the docking station 14 is a horizontally elongated rectangular opening 60 which is normally covered by a door plate 62. The door plate 62 is connected along its lower side edge to the docking station 14 for downward and rearward pivotal motion into the interior of the docking station, and is spring-biased toward its upright position, as shown in FIG. 1, in which it covers the opening 60.

The portable computer 12 is rearwardly insertable into the docking station 14 through the opening 60 as indicated by the arrow 64 in FIG. 1. A motorized drive system within the docking station 14 operates in response to this manual insertion of the portable computer to further translate it and automatically connect it to peripheral devices such as the external peripheral devices 48, 50 and 52 through circuitry in the docking station 14. The motorized drive system is also selectably operable to eject the inserted computer outwardly through the opening 60 and automatically disconnect it from the docking station.

Immediately to the right of the pivotable door plate 60 are a display window 66, for example, a four character liquid crystal display ("LCD"), in which various docking station operating indicia of the docking station are automatically displayed, an "on/off/eject" switch 68 and a key lock 70 for the docking station 14. Exposed beneath the door plate 62 are the front ends of a 3.5" inch floppy disk drive 74 and a 5.25" floppy disk drive 72.

Figure 3:
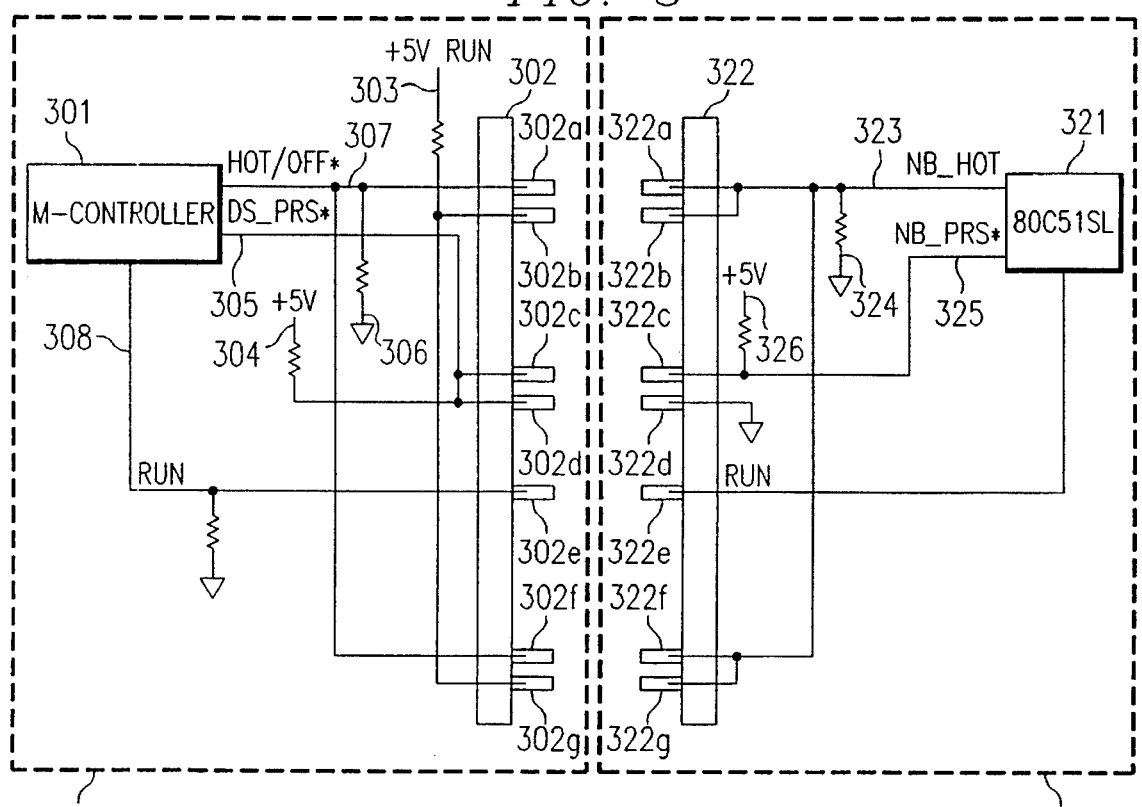
FIG. 3 illustrates a schematic diagram of the portable computer and docking station of the present invention, including a detail of connectors therebetween.

Turning now to FIG. 3, illustrated is a schematic diagram of the portable computer and docking station of the present invention, including a detail of connectors therebetween. The portable computer, represented in dashed line and referenced as 12, includes a portable computer controller 301 and a portable computer connector 302 which, in one embodiment of the present invention, is a male connector. The docking station, also represented in dashed line and referenced as 14 includes a docking station controller 321 and a docking station connector 322 which, in an embodiment of the present invention, is a female connector corresponding to and designed to mate with connector 302. As is represented in FIG. 3, the connectors 302, 322 contain a plurality of corresponding pins 302a–g and 322a–g. Other pins are present in the connectors 302, 322, but are not shown because they are not pertinent to the present invention. As shown, pins 302a,b,f and g and corresponding pins 322a,b,f and g are elongated, so as to come into contact first when the connectors 302, 322 are mated together. It should be understood that, in reality, only the male connector actually has protruding pins and that these alone are elongated. The female connector simply receives the elongated pins of the male connector first. In fact, as previously mentioned, the AMP Corporation sells off-the-shelf connectors having some pins longer than the others. These elongated pins are usually employed to establish a common ground between the connectors prior to a complete mating. However, the present invention can be understood without detailing the exact way in which the connectors 302, 322 mate. It is enough to understand that some pins mate earlier than others. FIG. 3 also details several signals in connection with the controllers 301, 321 and connectors 302, 322. The signals are as follows:

+5VRUN—an active high signal. High if the portable computer is in a normal operating mode and low if the portable computer is in a suspend or off mode.

HOT/OFF*—an active low signal. High if the portable computer is in a normal operating mode and the extended pins are mated.

NB-HOT—an active high signal. High if the portable computer is in a normal operating mode. This signal corresponds to HOT/OFF*, but is on the docking station side.

DS-PRS*—an active low signal. Low if the portable computer detects the presence of the docking station.

NB-PRS*—an active low signal. Low if the docking station detects the presence of the portable computer.

RUN—an active high signal. The docking station employs this signal to indicate to the portable computer controller that the combined portable computer/docking station system is ready to run.

As previously mentioned, the user has always been able to dock the portable computer to the docking station when the portable computer is in a suspend mode or is turned off. However, the present invention is advantageously designed to operate when the user attempts to dock the portable computer 12 while it is still in a normal operating mode. When the portable computer is in a normal operating mode, the +5VRUN signal 303 is high. Accordingly, pins 302b and 302g are also high but, since they are not coupled to any other circuitry, they are high in isolation. A +5 V source 304 is coupled to a DS-PRS* pin 305. Since DS-PRS, is active low, DS-PRS* is inactive by virtue of being coupled to the +5 V source 304. Finally, the HOT/OFF* signal is made active at a HOT/OFF* pin 307 by virtue of being coupled to ground 306. Finally, the RUN signal is brought low at a RUN pin 308, indicating to the portable computer 12 that it is not free to operate as a docked computer.

On the docking station 14 side, an NB-HOT pin 323 is brought low and inactive by virtue of being coupled to ground 324. This indicates to the docking station controller 321 that the portable computer 12 is not hot. An NB-PRS* pin 325 is brought high by virtue of being coupled to a +5 V source 326. Therefore, NB-PRS, is inactive. This tells the docking station controller 321 that the portable computer is not present and, because it is not present, it cannot be hot.

As the portable computer 12 is inserted into the docking station 14 and begins to translate rearward toward a fully docked position, the connector 302 translates toward the connector 322 from an initial spaced apart position toward a fully engaged position, in which all of the pins of the connector 302 are electrically and mechanically joined to all of the pins of the connector 322. However, as full connection impends, the extended pins of the connectors 302 and 322 couple before the remaining normal pins. Specifically, extended pins 302a, 302b, 302f and 302g couple with corresponding extended pins 322a, 322b, 322f and 322g.

In the present invention, the extended pins are designed to make contact first, allowing the portable computer 12 an opportunity to place itself in suspend mode prior to coupling of the remaining, normal pins. For instance, if the extended pins are 4 mm longer than the normal pins, then the portable computer 12 must traverse an extra 4 mm to make contact with the normal pins after making contact with the extended pins. If the docking station 14 is motorized and draws the portable computer 12 rearward under motive force at a rate of 4 cm per second, then it takes about 100 ms to traverse this 4 mm distance. The portable computer 12, therefore, has about 100 ms to transition into a suspend mode. Although non-motorized docking stations do not provide a controlled motive force to draw the portable computer rearwardly, the same calculation applies, only the translation speed changes.

Accordingly, when extended pins 302a, 302b, 302f, 302g contact corresponding extended pins 322a, 322b, 322f, 322g the +5VRUN signal 303 is "looped back" along two separate paths: (1) a path taking in extended pins 302b, 322b, 322a and 302a to the HOT/OFF* pin 307 and (2) a path taking in extended pins 302g, 322g, 322f and 302f back to the HOT/OFF* pin 307. Therefore, the HOT/OFF* pin 307 transitions from a low state to a high state (active to inactive). This indicates to the portable computer controller 301 that it is to begin a transition from normal operating mode to suspend mode, because a docking with the docking station 14 is imminent.

As shown in FIG. 3, in the preferred embodiment of the present invention, the extended pins are located at opposite extremes of the connectors 302, 322. This is so as not to prejudice or delay the HOT/OFF, signal reaching the portable computer controller 301 of the portable computer 12 in case the connectors 302, 322 are misaligned when they begin to mate. If the top (as shown) of the connectors couple prior to the bottom, the first path, comprising pins 302a, 302b, 322a and 322b will complete a loopback circuit first. Obviously, if the connectors are misaligned the other way, the second path will complete a loopback circuit. In either event, the portable computer controller 301 receives a timely indication of impending docking.

In a preferred embodiment of the present invention, the docking of the portable computer is under control of a motor which, in fact, is a stepping motor. Since, as has been shown above, the portable computer may only have 100 ms or so within which to reach a suspend mode, which may be insufficient. The docking station controller 321 has an opportunity, via a second loopback circuit and the NB-HOT* signal, to detect the impending docking of the portable computer and to slow or stop the stepping motor in response thereto, giving the portable computer 12 a longer period of time during which to accomplish its transition to a suspend mode. Therefore, the present invention provides a delay of benefit to both the controllers 301, 321. If, on the other hand, the docking station 14 is not motorized, the docking station can provide, in lieu of a motor, a speed governing device to limit the speed at which the user can push the portable computer into the docking station. This also affords the portable computer time to transition.

Figure 4:
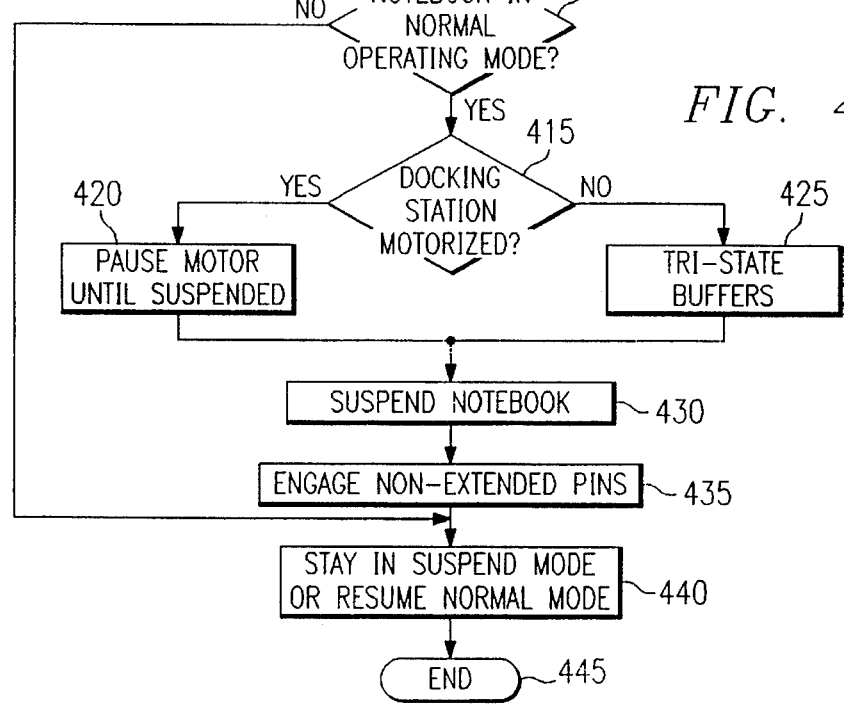
FIG. 4 illustrates a flow diagram of the method of the present invention.

Turning now to FIG. 4, illustrated as a flow diagram of the method of the present invention. Execution begins at block 400, wherein the portable computer is inserted into the docking station and the docking station begins to translate the portable computer rearwardly toward its docked position. In block 405, the portable computer has proceeded far enough to allow the extended pins to engage, thereby enabling the loopback circuits of FIG. 3. Next, in decisional block 410, the status of the portable computer is determined. If the portable computer is in a suspend or off mode, the present invention is not required and the portable computer continues to a fully docked position.

On the other hand, if the portable computer is in a normal operating mode, execution proceeds to decisional block 415, the outcome of which depending on whether the docking station is motorized or not motorized. If the docking station is motorized, execution proceeds to block 420 wherein the docking station microcontroller pauses operation of the docking station motor until the portable computer has completed its transition to a suspend mode. If, on the other hand, the docking station is not motorized, execution proceeds to block 425 wherein, to prevent data corruption, all of the signal lines have been provided with buffers on either sides of the connectors 302, 322 of FIG. 3. Accordingly, in block 425, these buffers are tri-stated to eliminate signal contentions between the portable computer and the docking station. If buffers are not employed, however, damage to components within the portable computer and the docking station is avoided by virtue of the fact that the portable computer quickly reaches a suspend state.

Execution proceeds to block 430, wherein the portable computer reaches a suspend state. At this point, the docking station detects the transition into a suspend state and, if the docking station is motorized, motor operation resumes. In a non-motorized docking station, the portable computer simply continues its travel rearward. At block 435, the non-extended pins are engaged, completing the docking of the portable computer to the docking station.

Execution proceeds to block 440, wherein the portable computer can either resume its normal operating mode or can stay in a suspend mode, ready for the user to return it manually to an operating mode, depending upon how it has been programmed in software. The choice of whether to return it to a normal operating mode or to leave it in a suspend mode is a feature of the present invention.

Finally, execution of the method of the present invention terminates at an end block 445, the portable computer having been fully docked and ready for normal operation in conjunction with the peripheral devices attached to the docking station.

From the above, it is apparent that the present invention is the first to provide a circuit for suspending operation of a docking portable computer comprising (1) a first circuit within the portable computer capable of detecting an impending electrical coupling of the portable computer to a corresponding docking station, the first circuit generating a signal indicating the impending coupling and (2) a second circuit within the portable computer capable of receiving the signal and placing the portable computer in a suspend mode at least until the portable computer fully electrically couples to the docking station.

Although the present invention and its advantages have been described in detail in the foregoing detailed description, those skilled in the art should clearly understand that the detailed description is given by way of illustration and example only and that various changes, substitutions and alterations can be made without departing from the spirit and scope of the invention as defined by the appended claims.

What is claimed is:

1. A portable computer/docking station system, comprising:

a portable computer having a first electrical connector, said first connector coupled to a portable computer controller within said portable computer;

a docking station having a second electrical connector, said first and second connectors adapted to translate towards one another from an initial spaced-apart position to effect a mechanical joining of said first and second connectors, said joining of said first and second connectors electrically coupling said portable computer controller to a docking station controller within said docking station to effect a docking of said portable computer to said docking station; and a circuit capable of detecting an impending occurrence of said mechanical joining of said first and second connectors, said circuit transmitting a signal to said portable computer controller, said portable computer controller placing said portable computer in a suspend mode at least until said first and second connectors are completely mechanically joined, wherein said portable computer is configured such that when said portable computer is remote from said docking station a logic signal indicative of whether the portable computer is in a normal operating mode is provided at a first contact pin of said first electrical connector.

2. The system as recited in claim 1 wherein said first connector is on a rear surface of said portable computer, said first connector comprising a first plurality of electrical contacts and coupled to a portable computer controller within said portable computer.

3. The system as recited in claim 1 wherein said second electrical connector is on an interior surface of said docking station, said second connector comprising a second plurality of electrical contacts corresponding to a first plurality of electrical contacts on said first connector.

4. The system as recited in claim 1 wherein said portable computer is adapted to translate rearwardly under a motive force to a location within said docking station to effect a docking of said portable computer to said docking station.

5. The system as recited in claim 1 wherein some of a first plurality of contacts in said first connector couple to a corresponding some of a second plurality of contacts in said second connector prior to all of said first plurality of contacts coupling to said corresponding second plurality of contacts.

6. The system as recited in claim 1 further comprising a second circuit within said docking station capable of detecting said impending occurrence of said mechanical joining of said first and second connectors, said second circuit transmitting a signal to said docking station controller, said docking station controller placing electrical components within said docking station in a condition to receive said portable computer.

7. The system as recited in claim 1 wherein said portable computer controller restores said portable computer to a normal operating mode following complete mechanical joining of said first and second connectors.

8. The system as recited in claim 1 wherein said circuit detects said impending electrical coupling when said portable computer and said docking station are misaligned.

9. The system as recited in claim 1 wherein said second connector comprises a plurality of pins, some of said plurality of pins being longer than other of said plurality of pins.

10. The system as recited in claim 1 wherein a motor within said docking station provides a motive force to translate said portable computer to couple said portable computer to said docking station.

11. A method of docking a portable computer to a docking station, comprising the steps of:

translating a first electrical connector toward a second electrical connector from an initial spaced-apart position, said first electrical connector mounted on said portable computer and coupled to a portable computer controller within said portable computer, said second electrical connector mounted on said docking station;

generating within said portable computer a logic signal indicative of whether the portable computer is in a normal operating mode and providing said logic signal to a first contact pin of said first electrical connector;

detecting an impending occurrence of a mechanical joining of said first and second connectors with a first circuit, said mechanical joining causing an electrical coupling of said portable computer to said docking station to effect a docking of said portable computer; and transmitting a signal from said first circuit to said portable computer controller, said portable computer controller placing said portable computer in a suspend mode at least until said first and second connectors are completely mechanically joined.

12. The method as recited in claim 11 wherein said first connector is on a rear surface of said portable computer, said first connector comprising a first plurality of electrical contacts and coupled to a portable computer controller within said portable computer.

13. The method as recited in claim 11 wherein said second electrical connector is on an interior surface of said docking station, said second connector comprising a second plurality of electrical contacts corresponding to a first plurality of electrical contacts on said first connector.

14. The method as recited in claim 11 further comprising the step of translating said portable computer rearwardly under a motive force to a location within said docking station to effect a docking of said portable computer to said docking station.

15. The method as recited in claim 11 further comprising the steps of (1) coupling some of a first plurality of contacts in said first connector to a corresponding some of a second plurality of contacts in said second connector and (2) coupling a remainder of said first plurality of contacts to a remainder of said corresponding second plurality of contacts.

16. The method as recited in claim 11 further comprising the step of detecting said impending occurrence of said mechanical joining of said first and second connectors with a second circuit within said docking station, said second circuit transmitting a signal to said docking station controller within said docking station, said docking station controller placing electrical components within said docking station in a condition to receive said portable computer.

17. The method as recited in claim 11 wherein said portable computer controller restores said portable computer to a normal operating mode following complete mechanical joining of said first and second connectors.

18. The method as recited in claim 11 wherein said circuit detects said impending electrical coupling when said portable computer and said docking station are misaligned.

19. The method as recited in claim 11 wherein said second connector comprises a plurality of pins, some of said plurality of pins being longer than other of said plurality of pins.

20. The method as recited in claim 11 wherein a motor within said docking station provides a motive force to translate said portable computer to couple said portable computer to said docking station.

21. A portable computer/docking station system, comprising:
   a portable computer having a first electrical connector on a rear surface thereof, said first connector comprising a first plurality of electrical contacts and coupled to a portable computer controller;
   a docking station having a second electrical connector on an interior surface thereof, said second connector comprising a second plurality of electrical contacts corresponding to said first plurality of contacts, said portable computer configured to translate rearwardly under motive force to a location within said docking station, said first and second connectors configured to translate towards one another from an initial spaced-apart position to mechanically join said first plurality of contacts with said corresponding second plurality of contacts to effect a docking of said portable computer to said docking station, some of said first plurality of contacts coupling to a corresponding some of said second plurality of contacts prior to all of said first plurality of contacts coupling to said corresponding second plurality of contacts;
   a first circuit within said portable computer capable of detecting said coupling of said some of said first plurality of contacts to said corresponding some of said second contacts, said first circuit transmitting a signal to said portable computer controller, said portable computer controller placing said portable computer in a suspend mode at least until said first and second connectors are completely mechanically joined; and
   a second circuit within said docking station capable of detecting said coupling of said some of said first plurality of contacts to said corresponding some of said second contacts, said second circuit transmitting a signal to said docking station controller, said docking station controller placing electrical components within said docking station in a condition to receive said portable computer.

22. The system as recited in claim 21 wherein said portable computer controller restores said portable computer to a normal operating mode following complete mechanical joining of said first and second connectors.

23. The system as recited in claim 21 wherein said some of said first and second pluralities of contacts are distributed about said first and second connectors, respectively, to thereby allow said first and second circuits to function when said first and second connectors are misaligned.

24. The system as recited in claim 26 wherein said second plurality of contacts are pins, said some of said second plurality of contacts being longer than other of said some of said second plurality of contacts.

25. The system as recited in claim 21 wherein a motor within said docking station provides said motive force.

26. A method of electrically joining a portable computer to a corresponding docking station, comprising the steps of:
   monitoring a status of a first connector on a rear surface of said portable computer with a portable computer controller, said first connector comprising a first plurality of electrical contacts;
   monitoring a status of a second electrical connector on an interior surface of said docking station with a docking station controller, said second connector comprising a second plurality of electrical contacts corresponding to said first plurality of contacts;
   translating said portable computer rearwardly under motive force to a location within said docking station, said first and second connectors translating towards one another from an initial spaced-apart position to effect a mechanical joining of said first plurality of contacts with said corresponding second plurality of contacts to effect a docking of said portable computer to said docking station;
   coupling some of said first plurality of contacts to a corresponding some of said second plurality of contacts prior to all of said plurality of contacts coupling to said corresponding second plurality of contacts;
   detecting said coupling of said some of said first plurality of contacts to said corresponding some of said second contacts with a first circuit within said portable computer;
   transmitting a first signal from said first circuit to said portable computer controller;
   placing said portable computer in a suspend mode with said portable computer controller at least until said first and second connectors are completely mechanically joined;
   detecting said coupling of said some of said first plurality of contacts to said corresponding some of said second contacts with a second circuit in said docking station;
   transmitting a second signal from said second circuit to said docking station controller;
   placing electrical components within said docking station in a condition to receive said portable computer with said docking station controller; and
   coupling a remainder of said first plurality of contacts to a corresponding remainder of said second plurality of contacts to effect a docking of said portable computer to said docking station.

27. The method as recited in claim 26 further comprising the step of restoring said portable computer to a normal operating mode following complete mechanical joining of said first and second connectors with said portable computer controller.

28. The method as recited in claim 26 wherein said some of said first and second pluralities of contacts are distributed about said first and second connectors, respectively, to thereby allow said first and second circuits to function when said first and second connectors are misaligned.

29. The method as recited in claim 26 wherein said second plurality of contacts are pins, said some of said second plurality of contacts being longer than other of said some of said second plurality of contacts.

30. The method as recited in claim 26 wherein a motor within said docking station provides said motive force.

* * * * *